Patented Oct. 21, 1930

1,779,221

UNITED STATES PATENT OFFICE

JOHN THOMAS AND HUGH ALBERT EDWARD DRESCHER, OF GRANGEMOUTH, SCOTLAND, ASSIGNORS TO SCOTTISH DYES, LIMITED, OF GRANGEMOUTH, STIRLING, SCOTLAND

DYESTUFF INTERMEDIATE FROM HALOGEN BENZOYL-BENZOIC ACIDS

No Drawing. Application filed December 7, 1926, Serial No. 153,214, and in Great Britain December 24, 1925.

This invention relates to the production of dyestuff intermediates from halogen benzoyl benzoic acids.

In the nomenclature of the benzoyl benzoic acids given below the positions in the benzene nucleus containing the carboxyl group are labelled from 1 to 6 beginning with the carboxyl group, whilst the positions in the benzene nucleus of the benzoyl group are labelled 1' to 6' beginning with the carbonyl group.

Compounds such as sodium sulphite appear to have different action on different halogen-2-benzoyl-benzoic acids when treated in the same way, for example although (3'-nitro-4'-halogen)-2-benzoyl-benzoic acids will react with sodium sulphite to give the sulphonic acid salts, if the conversion of (4'-halogen)-2-benzoyl-benzoic acid is attempted in a similar way no appreciable quantity of the equivalent (4'-sulpho)-2-benzoyl-benzoic acid is formed.

The object of the present invention is to provide a process for the production of dyestuff intermediates by the reaction of a sulphite or hydrogen-sulphite on halogen-2-benzoyl-benzoic acids generally and particularly (4'-halogen)-2-benzoyl-benzoic acid.

To this end we have made a number of experiments and have found that by treating the salts of the halogen-2-benzoyl-benzoic acid with a sulphite or bisulphite at a temperature higher than about 100° C., the desired results are obtained.

The invention consists in reacting on halogen-2-benzoyl-benzoic acids except (3'-nitro-4'-halogen)-2-benzoyl-benzoic acids with a sulphite or sulphites of sodium or the like at a temperature higher than about 100° C. especially by reacting on (4'-halogen)-2-benzoyl-benzoic acid with neutral alkaline sulphite solution under the conditions indicated above.

The invention also consists in the improved processes herein indicated and in the products thereof.

The accompanying examples illustrate methods by which the invention may be carried into effect, all parts being parts by weight:—

Example 1

282 parts of the sodium salt of (4'-chlor)-2-benzoyl-benzoic acid and 189 parts of sodium sulphite are mixed with 1,000 parts of water in an autoclave provided with a stirrer. The autoclave may be of iron or any other suitable material. The heating is continued until a temperature corresponding to a pressure of 100 to 120 lbs. per square inch (about 180° C.) has been obtained and it is kept at this temperature for a suitable time for example 6 to 24 hours after which the contents of the vessel are allowed to cool. The contents of the autoclave may be acidified and then filtered to remove any unchanged (4'-chlor)-2-benzoyl-benzoic acid that may be present, the liquors are treated so as to isolate the (4'-sulpho)-2-benzol-benzoic acid. The product may be separated in the form of the sodium salt by evaporation or in the form of the acid by salting out after addition of mineral acid.

Example 2

The (4'-sulpho)-2-benzol-benzoic acid can be converted by condensing agents, for example with sulphuric acid, into the anthraquinone sulphonic acid.

This process may be carried out as follows:—

20 grams of the dry product as obtained by the evaporation of the liquors in the above example, which contain also sodium chloride, sodium sulphate, and possibly sodium sulphite, is added to 140 grams of 5 per cent. oleum with stirring at 90° C. The temperature is then raised to 180° C. and maintained at that temperature for 15 minutes. The melt is then cooled and poured into 1250 cc. of water. This mixture is boiled and filtered hot to remove traces of 2-chlor-anthraquinone. The filtrates are salted out by adding sufficient sodium chloride to make a 5 per cent. salt solution. The mixture is boiled and allowed to cool and filter. The precipitate is then washed with 5 per cent. salt solution until free from acid.

General

In place of sodium or sodium hydrogen sulphite similar compounds of potassium or the like may be employed.

The reaction indicated between (4′-halogen)-2-benzoyl-benzoic acid and the reacting compound is of commercial importance among other reasons because it enables anthraquinone-2-sulphonic acid to be prepared without the formation of isomeric bodies as by-products.

The reaction indicated proceeds smoothly and the sulpho-benzoyl-benzoic acids are easily obtained in a state of purity and readily separated from any unchanged halogen-2-benzoyl-benzoic acid that may be present.

The addition of a small proportion of a copper salt appears to be beneficial; for instance, in Example 1, 3 parts of copper sulphate may with advantage be added.

The invention is not confined to halogen benzoyl-benzoic acids in which the halogen is attached to the benzene nucleus not containing the carboxylic acid substituent, but can be applied to halogen-2-benzoyl-benzoic acids and their derivatives generally, including those containing halogen in the benzene nucleus to which is attached also the carboxylic acid substituent such as, for example, those halogenated benzoyl-ortho-benzoic acids which are made by condensing halogenated phthalic anhydride with benzene and its derivatives.

To state the matter in other terms the invention is applicable to halogen derivatives of 2-benzoyl-benzoic acid no matter in which of its two benzene nuceli the halogen or halogens may be present. Further, where reference has been made to normal sulphite or acid sulphite the one is to include the other unless the context requires the contrary.

Having now described our invention what we claim as new and desire to secure by Letters Patent is:—

1. A process for producing dyestuff intermediates which consists in acting on (4′-halogen)-2-benzoyl-benzoic acid with a solution of normal sodium sulphite at a temperature of about 180° C.

2. A process for producing dyestuff intermediates which consists in acting on the sodium salt of (4′-chlor)-2-benzoyl-benzoic acid with a solution of neutral sodium sulphite in a closed vessel at a temperature which causes the mixture or solution to have a pressure of from 100–120 lbs. per square inch.

3. 4′-(sulpho)-2-benzoyl-benzoic acid.

4. A process for producing dyestuff intermediates which consists in acting on (4′-halogen)-2-benzoyl-benzoic acid with a water soluble sulphite in aqueous solution at an elevated temperature.

5. A process for producing dyestuff intermediates which consists in reacting on (halogen)-2-benzoyl-benzoic acids except (3′-nitro-4′-halogen)-2-benzoyl-benzoic acids with a water soluble sulphite in aqueous solution at a temperature above 100° C.

6. A process for producing dyestuff intermediates which consists in acting on halogen-2-benzoyl-benzoic acids with a water soluble sulphite in aqueous solution at an elevated temperature.

In testimony whereof we have signed our names to this specification.

JOHN THOMAS.
HUGH ALBERT EDWARD DRESCHER.